US011003001B2

(12) United States Patent
Liu et al.

(10) Patent No.: US 11,003,001 B2
(45) Date of Patent: May 11, 2021

(54) METHOD FOR MANUFACTURING A CURVED DISPLAY SUBSTRATE USING A TAPE CASTING METHOD, METHOD FOR MANUFACTURING A CURVED DISPLAY PANEL USING THE SAME

(71) Applicants: BOE Technology Group Co., Ltd., Beijing (CN); Hefei Xinsheng Optoelectronics Technology Co., Ltd., Hefei (CN)

(72) Inventors: Haifeng Liu, Beijing (CN); Xiaoye Ma, Beijing (CN); Xiping Wang, Beijing (CN)

(73) Assignees: BOE Technology Group Co., Ltd., Beijing (CN); Hefei Xinsheng Optoelectronics Technology Co., Ltd., Hefei (CN)

( * ) Notice: Subject to any disclaimer, the term of this patent is extended or adjusted under 35 U.S.C. 154(b) by 326 days.

(21) Appl. No.: 15/801,590

(22) Filed: Nov. 2, 2017

(65) Prior Publication Data
US 2018/0275435 A1    Sep. 27, 2018

(30) Foreign Application Priority Data

Mar. 23, 2017 (CN) .......................... 201710178976.1

(51) Int. Cl.
*G02F 1/1333* (2006.01)
*G02F 1/16755* (2019.01)
(Continued)

(52) U.S. Cl.
CPC ...... *G02F 1/1333* (2013.01); *G02F 1/133305* (2013.01); *G02F 1/133516* (2013.01);
(Continued)

(58) Field of Classification Search
CPC .......... G02F 1/133325; G02F 1/16755; G02F 1/1533; G02F 1/133354; G02F 2001/1536
See application file for complete search history.

(56) References Cited

U.S. PATENT DOCUMENTS

2003/0112406 A1* 6/2003 Lung ..................... G02F 1/1333
349/158
2007/0030439 A1    2/2007 Kinoshita et al.
(Continued)

FOREIGN PATENT DOCUMENTS

CN          1481513 A       3/2004
CN          1533561 A       9/2004
(Continued)

OTHER PUBLICATIONS

Mar. 25, 2019—(CN) First Office Action Appn 201710178976.1 with English Translation.

*Primary Examiner* — Paul C Lee
(74) *Attorney, Agent, or Firm* — Banner & Witcoff, Ltd.

(57) ABSTRACT

A method for manufacturing a display substrate, a method for manufacturing a display panel, and a display panel are disclosed. The method for manufacturing a display substrate includes: providing a base substrate, in which the base substrate includes a first surface and a second surface which are opposite to each other; reducing a thickness of the base substrate from the first surface by way of a thinning process; and forming a first protective layer on the first surface obtained after thinning by a tape casting method.

5 Claims, 8 Drawing Sheets

(51) Int. Cl.
 G02F 1/1335 (2006.01)
 G02F 1/153 (2006.01)
(52) U.S. Cl.
 CPC .... G02F 1/16755 (2019.01); *G02F 1/133325* (2021.01); *G02F 1/133354* (2021.01); *G02F 2001/1536* (2013.01); *G02F 2201/50* (2013.01)

(56) References Cited

U.S. PATENT DOCUMENTS

| | | |
|---|---|---|
| 2008/0152842 A1 | 6/2008 | Searle |
| 2013/0133814 A1* | 5/2013 | Shang .................... B32B 38/00 156/182 |
| 2015/0000823 A1* | 1/2015 | Kim .................. G02F 1/133528 156/80 |
| 2015/0309359 A1* | 10/2015 | Wu .................. G02F 1/133514 359/891 |
| 2017/0082889 A1 | 3/2017 | An et al. |

FOREIGN PATENT DOCUMENTS

| | | | | |
|---|---|---|---|---|
| CN | 101398989 A | | 4/2009 | |
| CN | 103235442 A | * | 8/2013 | ....... G02F 1/133514 |
| CN | 103424913 A | | 12/2013 | |
| CN | 203422536 U | | 2/2014 | |
| CN | 105044987 A | | 11/2015 | |
| JP | 2005317018 A | * | 11/2005 | ......... G06F 16/9535 |
| TW | I237716 B | | 8/2005 | |

\* cited by examiner

METHOD FOR MANUFACTURING A CURVED DISPLAY SUBSTRATE USING A TAPE CASTING METHOD, METHOD FOR MANUFACTURING A CURVED DISPLAY PANEL USING THE SAME

CROSS-REFERENCE

The present application claims priority to the Chinese Patent Application No. 201710178976.1, filed Mar. 23, 2017, the entire disclosure of which is incorporated herein by reference as part of the present application.

TECHNICAL FIELD

Embodiments of the present disclosure relate to a method for manufacturing a display substrate, a method for manufacturing a display panel, and a display panel.

BACKGROUND

The retina of a human eye is curved. When a user views an image displayed by a flat-panel display (FPD), as the visual ranges from the human eye to a central area and a border area of the FPD panel are different, the image viewed by the user will be distorted, causing differences in visual effects and affecting the user's sense of view.

In order to satisfy the viewing requirement of users, a curved display technology has been gradually developed and is widely applied in the display fields such as electronics game, large screen displays, and high-end TVs. A curved display panel adopts curved design, and the distance from a central area and a border area thereof to eyes of a human is roughly equal, so superior viewing angles can be realized for the border area of the curved display panel. Thus, better viewing experience can be achieved; a wide panorama image effect can be provided; and more superior approaching sense better than that brought by an FPD panel can be provided. However, due to the delayed effect caused by the bending stress of the curved display panel, in the process of displaying a pure black image, a severe light leakage phenomenon may occur at the border area of the curved display panel, so the contrast and the display quality of the curved display panel can be greatly affected.

SUMMARY

An embodiment of the present disclosure provides a method for manufacturing a display substrate, comprising: providing a base substrate, in which the base substrate includes a first surface and a second surface which are opposite to each other; reducing a thickness of the base substrate from the first surface by way of a thinning process; and forming a first protective layer on the first surface obtained after thinning by a tape casting method.

For example, the method for manufacturing the display substrate of an embodiment may further comprise: pressing a polarizing layer and a second protective layer on the first protective layer in sequence, so as to form a polarizer by the first protective layer, the polarizing layer and the second protective layer.

For example, the method for manufacturing the display substrate of an embodiment may further comprise: forming display elements on the second surface before the thinning process.

For example, the method for manufacturing the display substrate of an embodiment, difference between a refractive index of the base substrate and a refractive index of the first protective layer is not greater than 10% of the refractive index of the base substrate.

Another embodiment of the present disclosure provides a method for manufacturing a display panel, comprising: providing a first display substrate and a second display substrate, in which the first display substrate includes a first surface and a second surface which are opposite to each other; cell-assembling the first display substrate and the second display substrate, so that the second surface of the first display substrate faces the second display substrate; reducing a thickness of the first display substrate from the first surface by way of a thinning process; and forming a first protective layer on the first surface obtained after thinning by a tape casting method.

For example, the method for manufacturing the display panel of an embodiment may further comprise: pressing a first polarizing layer and a second protective layer on the first protective layer in sequence, so as to form a first polarizer by the first protective layer, the first polarizing layer and the second protective layer.

For example, the method for manufacturing the display panel of an embodiment may further comprise: bonding a second polarizer to a third surface of the second display substrate away from the first display substrate, in which the second polarizer includes a third protective layer, a second polarizing layer and a fourth protective layer which are arranged in sequence, and is bonded to the third surface through a bonding layer.

For example, the method for manufacturing the display panel of an embodiment may further comprise: reducing a thickness of the second display substrate from a third surface of the second display substrate away from the first display substrate by way of a thinning process; and forming a third protective layer on the third surface obtained after thinning by a tape casting method.

For example, the method for manufacturing the display panel of an embodiment may further comprise: pressing a second polarizing layer and a fourth protective layer on the third protective layer in sequence, so as to form a second polarizer by the third protective layer, the second polarizing layer and the fourth protective layer.

For example, in the method for manufacturing the display panel of an embodiment, display elements are provided on the second surface of the first display substrate.

For example, the method for manufacturing the display panel of an embodiment may further comprise: forming a curved display panel by bending and solidification of the first display substrate and the second display substrate after forming the second polarizer.

Further another embodiment of the present disclosure provides a display panel, comprising: a first display substrate and a second display substrate which is arranged opposite to the first display substrate; the first display substrate includes a first surface away from the second display substrate and a second surface facing the second display substrate; a first polarizer is disposed on the first surface and includes a first protective layer, a first polarizing layer and a second protective layer which are arranged in sequence; and the first protective layer is in direct contact with the first surface.

For example, in the display panel of an embodiment, the second display substrate includes a third surface away from the first display substrate; a bonding layer and a second polarizer are disposed on the third surface; the second polarizer includes a third protective layer, a second polarizing layer and a fourth protective layer; and the bonding layer is disposed between the third protective layer and the third surface.

For example, in the display panel of an embodiment, the second display substrate includes a third surface away from the first display substrate; a second polarizer is disposed on the third surface and includes a third protective layer, a second polarizing layer and a fourth protective layer; and the third protective layer is in direct contact with the third surface.

Still another embodiment provides a display device comprising the above-described display panel.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
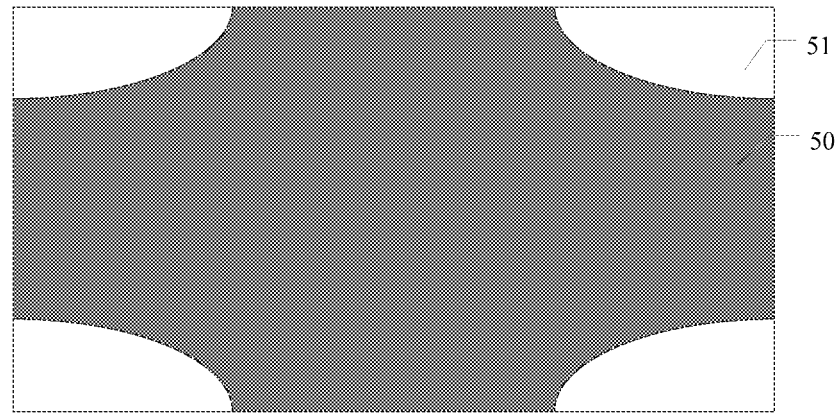
FIG. 1 is a schematic diagram illustrating the dark-state light leakage of a curved display panel.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Detailed description on known functions and known components may be omitted for clear and simple description of the embodiment of the present disclosure.

Currently, liquid crystal display (LCD) modes mainly include twisted nematic (TN) mode, vertical alignment (VA) mode, in-plane switching (IPS) mode and advanced super dimension switch (ADS) mode. The ADS mode is a display mode capable of effectively improving the viewing angle and the image quality of an LCD. One main characteristic of the ADS mode is normally black (NB) mode. That is to say, when signals of scanning lines are in the off-state, liquid crystal molecules are not under the action of an electric field, so upper and lower polarizers produce light extinction and the black state is displayed. With the development of display technology, the curved display technology has been gradually developed. A curved display can bring about better approaching sense than an FPD. However, if the display panel is subjected to a curve processing, as the display panel has bending stress (including compression stress and tension stress), the light phase delay of the panel is different between a border area and a central area. Thus, in the normal black mode, a severe light leakage phenomenon occurs at the border area of the curved display panel. That is to say, when no signal is applied to the curved display panel, if only a backlight is lightened, light leakage occurs at peripheral fixed positions of the curved display panel, so the brightness uniformity of the curved display panel can be affected, and hence the product quality can be severely affected.

FIG. 1 is a schematic diagram illustrating the dark-state light leakage of a curved display panel. As illustrated in FIG. 1, the thicknesses of a color filter (CF) substrate and an array substrate of a curved display panel 50 are both 0.5 mm, and the curvature of the curved display panel is 1,800 mm. If the curved display panel 50 adopts an ADS mode, when liquid crystal molecules are in the dark state, namely when no scanning signals are applied to the curved display panel 50, if only a backlight is lightened, a light leakage area 51 respectively appear on four corners of the curved display panel 50, so a light leakage phenomenon occurs, and hence the display quality of the curved display panel 50 can be severely affected.

The light leakage phenomenon is relevant to the stress applied to a glass substrate of the curved display panel obtained after bending, and the stress in the glass substrate is relevant to the thickness of the glass substrate. After the summary and the empirical verification by researchers in LCD-related fields, in the curved state, the phase delay of glass on light is in proportion to the curvature radius and the thickness of the glass substrate. For instance, the compression stress applied to glass during bending, and the curvature radius and the thickness of the glass substrate have the following corresponding relationship:

$$\sigma = \frac{E \times T}{2r}$$

where σ refers to the compression stress; r refers to the curvature radius; E refers to Young's modulus; and T refers to the thickness of glass. When the glass substrate is bent, the difference between the tension stress and the compression stress on the upper and lower surfaces respectively results in optical path difference, so the glass has different phase delay on light at different positions. The relationship between the phase delay and the compression stress is as follows:

$$Ret = s \times T \times (\sigma_{max} - \sigma_{min})$$

wherein Ret refers to phase delay; $\sigma_{max}$ and $\sigma_{min}$ respectively refer to the maximum compression stress and the minimum compression stress of the glass substrate; and s refers to the pressure and optical characteristic parameter of this material, for instance, as for a kind of Corning glass, s is 3.38E-6 Mpa$^{-1}$. Thus, the phase delay and the thickness and the curvature radius of the glass may have the following proportional relation:

$$Re\,t \propto \frac{T1 \times T2}{r}$$

wherein Ret refers to phase delay; T1 and T2 respectively refer to the glass thickness of the CF substrate and the array substrate; and r refers to the curvature radius of the curved display panel. Therefore, in the case of unchanged curvature radius r, when the thickness of the glass substrate is reduced, the phase delay Ret of the glass substrate can be effectively reduced, so the impact of the glass substrate on light efficiency can be reduced, and the dark-state light leakage phenomenon can be alleviated. However, in a high-generation LCD production line, due to the large size of the used glass substrate, for instance, as for a G8.5 production line, the size of the glass substrate may reach up to 2.5 m×2.2 m, the mass production of glass with the thickness of less than 0.5 mm can be difficult to realize, that is, before a curve processing, the glass thickness of the CF substrate and the array substrate is usually 0.5 mm.

As for a curved display panel, in order to alleviate the light leakage phenomenon and reduce the glass stress, two glass substrates of the curved display panel must be processed by way of a thinning process, so as to reduce the thicknesses of the two glass substrates of the curved display panel. The thinning process of glass usually reduces the thickness by way of the corrosion of acid upon the glass substrate. The topography of the glass surface obtained after thinning changes, and the height difference in the topography of the glass surface become larger, namely the light scattering of the glass surface is enhanced and the light efficiency is reduced. Thus, the glass surface obtained after thinning should be subjected to a polishing treatment. The polishing process mainly adopts a polishing tool and abrasive grains (e.g., cerium dioxide ($CeO_2$) powder) to polish a surface of the work piece. The height difference in the topography of the surface of the glass substrate obtained after the polishing treatment, for instance, can be reduced from 75 nm to 30 nm. Thus, the light scattering of the topography of the glass surface can be reduced. But the polishing process brings about dust pollution and meanwhile increases the production cost.

At least one embodiment of the present disclosure provides a method for manufacturing a display substrate, a method for manufacturing a display panel, and a display panel. The method for manufacturing a display substrate includes: providing a base substrate, in which the base substrate includes a first surface and a second surface which are opposite to each other; reducing the thickness of the base substrate from the first surface by way of a thinning process; and forming a first protective layer on the first surface obtained after thinning by a tape casting method (also referred to doctor-blade casting method).

Description will be given below to the method for manufacturing a display substrate, the method for manufacturing a display panel, and the display panel provided by the embodiments of the present disclosure, with reference to the accompanying drawings. But the present disclosure is not limited to the embodiments.

First Embodiment

Figure 2:
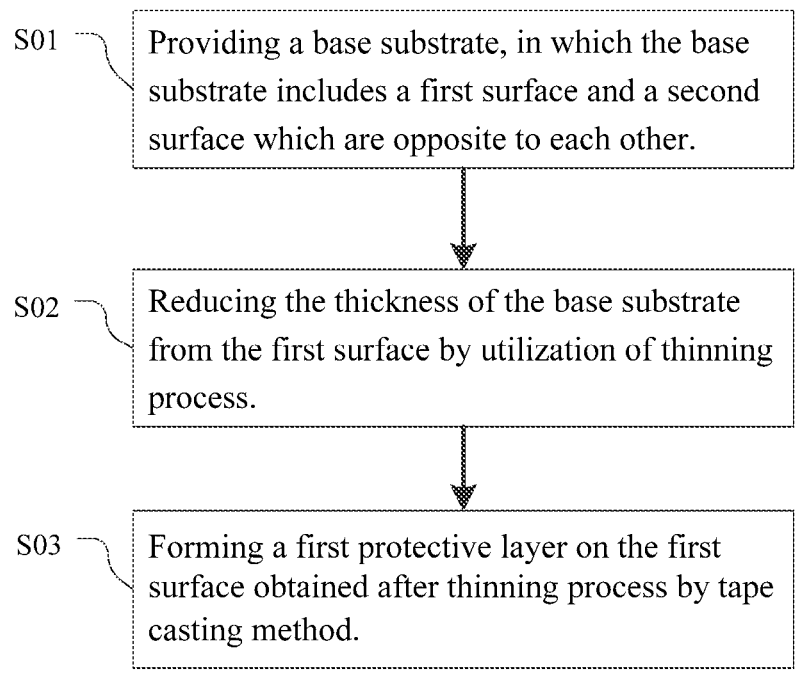
FIG. 2 is a flow diagram of a method for manufacturing a display substrate provided by an embodiment of the present disclosure.

The embodiment provides a method for manufacturing a display substrate. FIG. 2 is a flow diagram of a method for manufacturing a display substrate, provided by the embodiment.

For instance, as illustrated in FIG. 2, the method for manufacturing the display substrate, provided by the embodiment, comprises the following steps:

S01: providing a base substrate, in which the base substrate includes a first surface and a second surface which are opposite to each other;

S02: reducing a thickness of the base substrate from the first surface by way of a thinning process; and S03: forming a first protective layer on the first surface obtained after thinning process by a tape casting method.

The method for manufacturing the display substrate performs a thinning process on the first surface of the display substrate and subsequently forms the first protective layer on the first surface by a tape casting method, which effectively improves the topography of the first surface obtained after thinning, and hence improves the production efficiency and reduces the production cost. On the other hand, the manufacturing method can also avoid dust pollution, improve the product yield, and improve the display effect.

For instance, the method for manufacturing the display substrate may further comprise: pressing a polarizing layer and a second protective layer on the first protective layer in sequence, so as to form a polarizer by the first protective layer, the polarizing layer and the second protective layer. The first protective layer is taken as one layer of the polarizer, so that the cost of the polarizer can be reduced.

For instance, the method for manufacturing the display substrate may further comprise: forming display elements on the second surface before the thinning process.

For instance, the display substrate may be an array substrate, so the display elements on the second surface may include pixel electrodes, thin-film transistors (TFTs), etc. Moreover, for instance, the display substrate may also be a color filter (CF) substrate, so the display elements on the second surface may include a black matrix (BM), color filters, etc.

Second Embodiment

Figure 3:
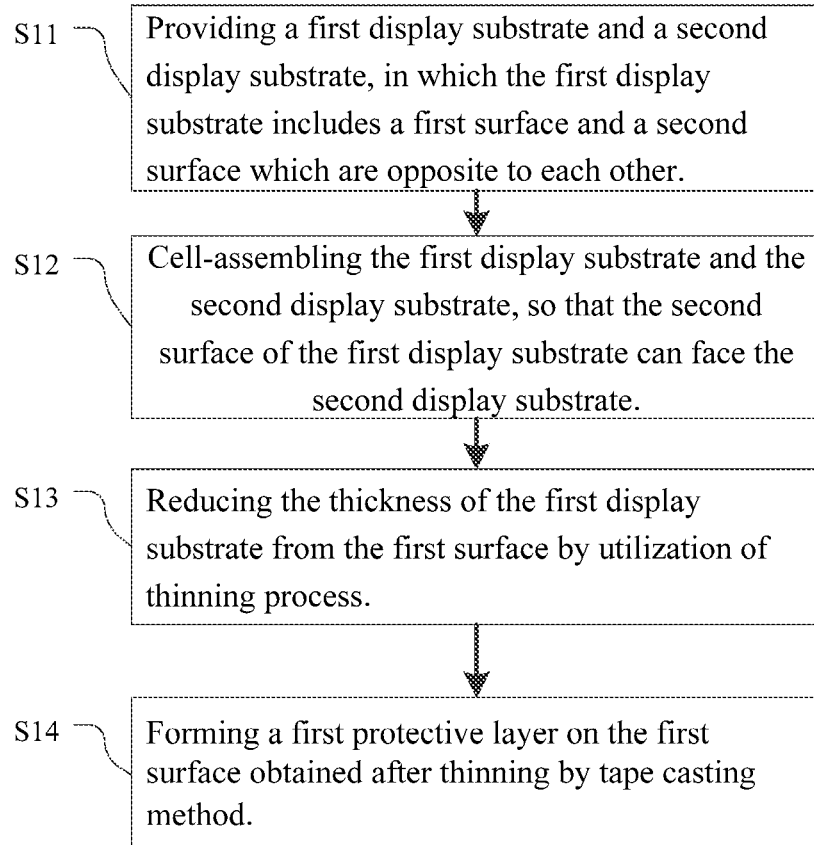
FIG. 3 is a flow diagram of a method for manufacturing a display panel provided by an embodiment of the present disclosure.

The embodiment provides a method for manufacturing a display panel. FIG. 3 is a flow diagram of the method for manufacturing the display panel, provided by the embodiment. FIGS. 4A-4J are flow diagrams illustrating the processes of the method for manufacturing the display panel provided by the embodiment. FIG. 5 is a schematic enlarged view of an R area in FIG. 4C. FIGS. 4A-4J only show one part of relevant structures for clearer description.

For instance, as illustrated in FIG. 3, the method for manufacturing the display panel provided by the embodiment, may comprise the following steps:

S11: providing a first display substrate and a second display substrate, in which the first display substrate includes a first surface and a second surface which are opposite to each other;

S12: cell-assembling the first display substrate and the second display substrate, so that the second surface of the first display substrate can face the second display substrate;

S13: reducing the thickness of the first display substrate from the first surface by way of a thinning process; and S14: forming a first protective layer on the first surface obtained after thinning by a tape casting method.

Detailed description will be given below to the processes of the method for manufacturing the display panel, provided by the embodiment, with reference to FIGS. 4A-4J.

Figure 4A:
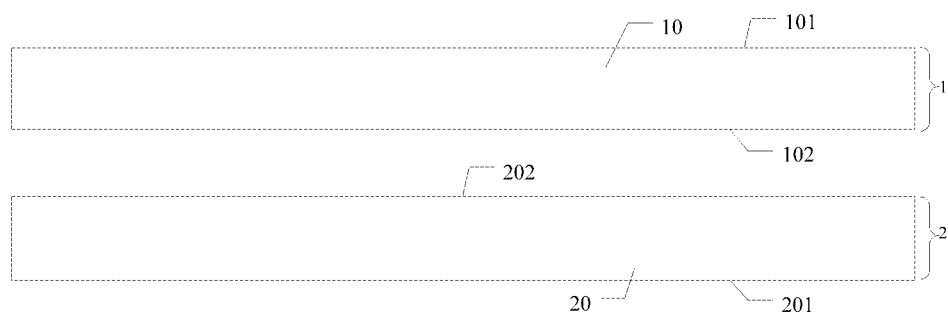
FIGS. 4A-4J are flow diagrams illustrating the processes of manufacturing the display panel provided by an embodiment of the present disclosure.
Figure 5:
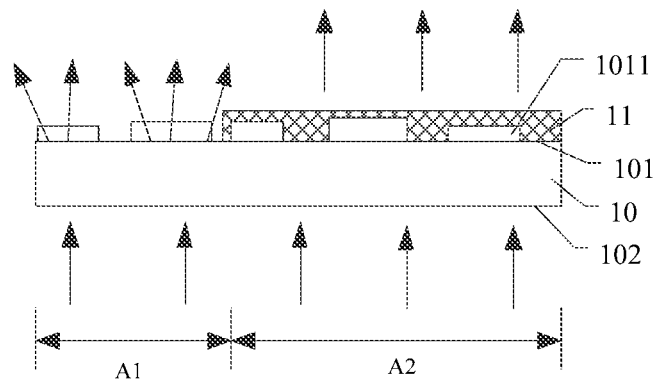
FIG. 5 is a schematic enlarged view of an R area in FIG. 4C.

For instance, as illustrated in FIG. 4A, a first display substrate 1 and a second display substrate 2 are provided; the first display substrate 1 includes a first surface 101 and a second surface 102 which are opposite to each other; and the first display substrate 1 and the second display substrate 2 are cell-assembled for forming a cell for containing liquid crystal, so that the second surface 102 of the first display substrate 1 can face the second display substrate 2.

For instance, the first display substrate 1 may include a first base substrate 10. The first base substrate 10 may be a transparent insulating substrate. The example of the transparent insulating substrate may be a glass substrate, a quartz substrate, a plastic substrate, a silica-gel substrate or other suitable substrate.

For instance, the second display substrate 2 may include a second base substrate 20. The second base substrate 20 may also be a transparent insulating substrate and may be same as or different from the first base substrate 10. No limitation will be given here in the embodiment.

For instance, the second display substrate 2 may include a third surface 201 away from the first base substrate 10 and a fourth surface 202 facing the first base substrate 10.

Figure 4B:
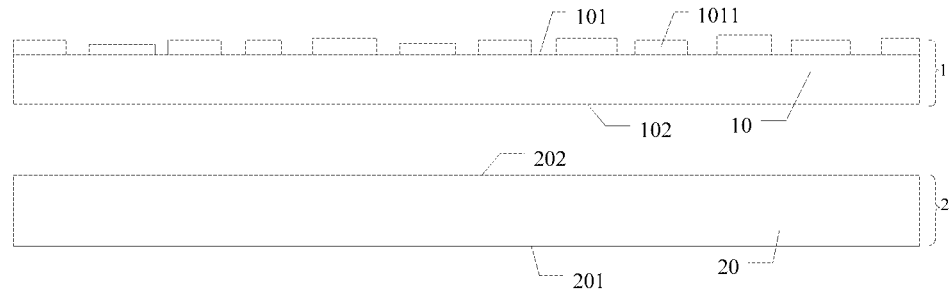

For instance, as illustrated in FIG. 4B, the thickness of the first base substrate 10 is reduced from the first surface 101 by way of a thinning process.

For instance, the thinning process may include a chemical thinning process and a physical thinning process. The physical thinning process may be mechanical grinding. The chemical thinning process may be chemical etching (for instance, acid etching thinning method carried out in a bath). The chemical thinning process, for instance, may adopt multi-piece upright immersion, single-piece upright spraying, waterfall flow, etc.

For instance, when the thinning process adopts the chemical thinning process, the thinning process selects suitable etching liquid (for instance, the etching liquid may be hydrofluoric acid), solution concentration, etching time period and the like according to the material of the first base substrate 10 and the thickness to be reduced, so as to satisfy different actual demands. It should be noted that: as for the curved display panel, the thickness required to be reduced can be calculated according to the curvature radius, the critical value of phase delay and the like for the curved display panel.

Moreover, for instance, the thinning process can also reduce the thickness of the first base substrate 10 by alternate conducting the processes of cleaning and etching of the first surface 101, remove excess reactants and etching solution that may adhere to the first surface 101 in time, and hence reduce the bonding of the etching reactants on the first surface 101, avoid uneven etching, effectively reduce the height difference in the topography of the first surface 101, and improve the product yield.

It should be noted that: in the thinning process, the first display substrate 1 and the second display substrate 2 must be subjected to a sealing treatment in advance so as to prevent an acid etching liquid from damaging elements in the display panel.

For instance, as illustrated in FIG. 4B, the surface topography of the first surface 101 obtained after thinning is changed. The surface topography, for instance, may include the height difference between the highest point and the lowest point on the first surface 101, etc. As illustrated in FIG. 4B, after the thinning process, a first concave-convex structure 1011 is formed on the first surface 101. The first concave-convex structure 1011 increases the height difference in the topography of the first surface 101 and hence increases the roughness of the first surface 101. The concave-convex degree of the first concave-convex structure 101 is in direct correlation with the reduced thickness of the first base substrate 10, so the height difference is also in direct correlation with the reduced thickness of the first base substrate 10. That is to say, when the reduced thickness of the first base substrate 10 is larger, the concave-convex degree of the first concave-convex structure 1011 is larger, and the height difference is larger. For instance, if the thickness of the first base substrate 10 with the thickness of 0.5 mm is reduced to be 0.25 mm, the height difference of the first surface 101 is converted from 3 nm to 75 nm.

Figure 4C:
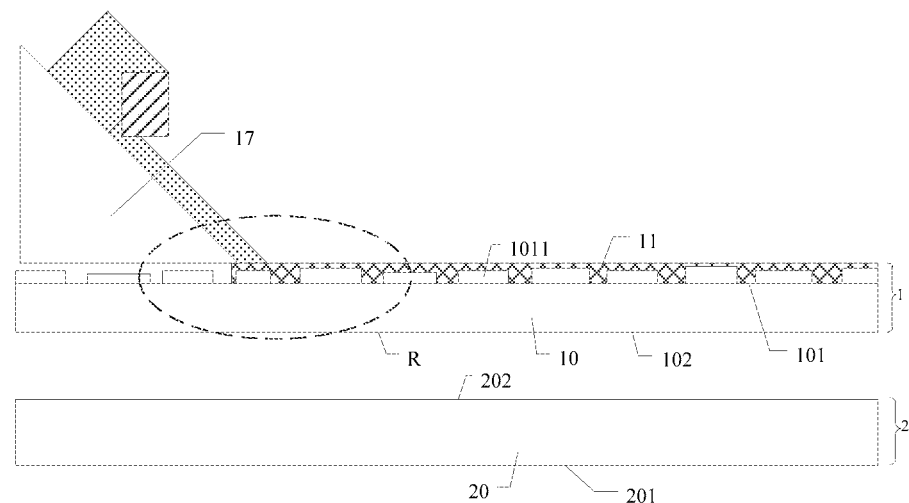

For instance, as illustrated in FIG. 4C, a first protective layer 11 is formed on the first surface 101 obtained after thinning by a tape casting method via a casting machine 17. The first protective layer 11 can reduce the height difference of the first surface 101. The tape casting method has the characteristics of need of a simple equipment, stable processes, continuous operation, applicability for mass production, large scale, automatic production and the like, and hence can improve the production efficiency and reduce the production cost. On the other hand, the first protective layer 11 formed by the tape casting method has the characteristics of good transparency, uniform thickness, balanced vertical and horizontal properties, etc. Thus, in the case of producing a substrate for a display device, the light absorption and the light scattering of the first surface 101 can be reduced; the conduction efficiency of light can be improved; and the display quality and the contrast of the display panel can be improved.

It should be noted that: in experiments, an atomic force microscope is utilized to observe the flatness of the glass surface before and after casting process, it can be found that the height difference of the glass surface before casting process is ±50 nm and the height difference of the glass surface after casting process is converted into ±20 nm. Therefore, the casting process can effectively reduce the height difference of the glass surface.

For instance, the difference between the refractive index of the first base substrate 10 and the refractive index of the first protective layer 11 is not greater than 10% of the refractive index of the first base substrate 10. According to the materials of the first base substrate 10, the first protective layer 11 may be made from different materials. When the first base substrate 10 is a glass substrate, the material of the first protective layer 11 may be cellulose triacetate (TAC). The refractive index of glass on light is 1.5, and the refractive index of TAC on light is 1.49. Thus, the formation of the first protective layer 11 on the first surface 101 not only can reduce the height difference of the first surface 101 but also will not affect or less affect the optical path difference when light runs through the first base substrate 10 and the first protective layer 11.

For instance, as illustrated in FIG. 5, after the thinning process, the surface topography of the first surface 101 is changed, namely the height difference of the first surface 101 is larger. In a first area A1, the first protective layer 11 is not formed on the first surface 101, so there will appear a large light scattering phenomenon when light runs through the first surface 101. In a second area A2, the first protective layer 11 is formed on the first surface 101; the difference between the refractive index of the first base substrate 10 and the refractive index of the first protective layer 11 is not large; and the first protective layer 11 is thin. Thus, light is almost not scattered when running through the first surface 101 but emitted along a predetermined direction. Therefore, the first protective layer 11 formed on the first surface 101 can improve the conduction efficiency of light, optimize the light emitting effect, and improve the display quality and the contrast in display.

For instance, the features such as the thickness, the uniformity and the density of the first protective layer 11 are controlled through the control on the technological parameters of the casting machine 17. The technological parameters, for instance, may include the slit width of the blade of the casting machine 17, the flow rate of the material that is applied, the solidification temperature of the resultant film after casting, etc. For instance, in the embodiment, when the first base substrate 10 is a glass substrate and the material of the first protective layer 11 is TAC, the following technological parameters of the casting machine 17 may be elected: the slit width of the cutting tool is 30 μm; the flow rate of the applied material is 5 cm/s; the solidification temperature of the resultant film after casting in a nitrogen environment is 110° C.; and the solidification temperature of the film in an air environment may be 80° C.-90° C.

Figure 4D:
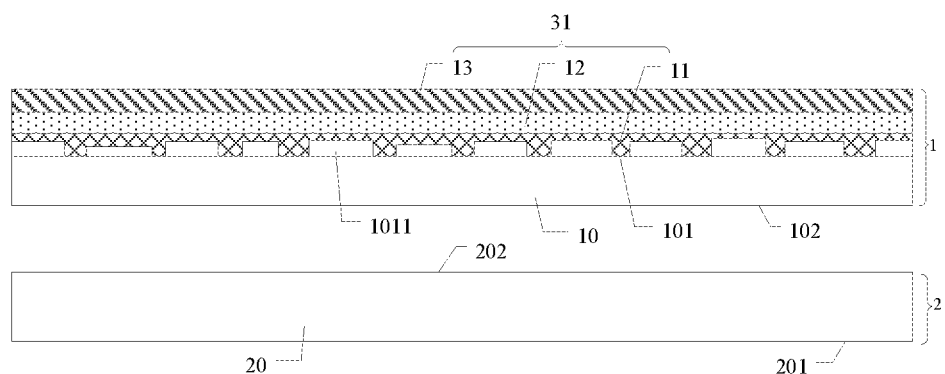

For instance, as illustrated in FIG. 4D, the method for manufacturing the display panel further comprises: pressing a first polarizing layer 12 and a second protective layer 13 on the first protective layer 11 in sequence, so as to form a first polarizer 31 by the first protective layer 11, the first polarizing layer 12 and the second protective layer 13.

Figure 6:
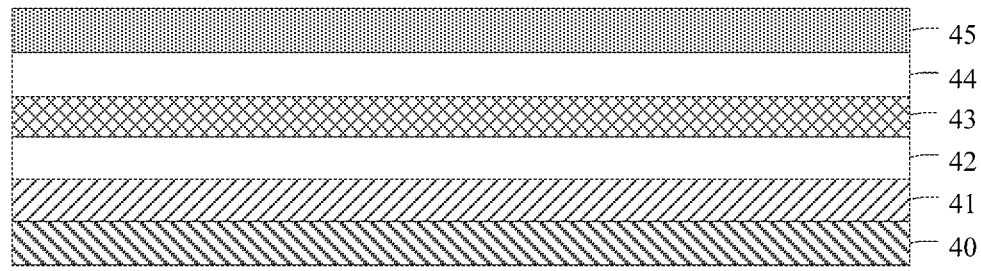
FIG. 6 is a schematic structural view of a polarizer.

For instance, FIG. 6 is a schematic structural view of a polarizer. As illustrated in FIG. 6, the polarizer mainly includes a stripping film 40, a pressure-sensitive adhesive layer 41, a first TAC layer 42, a polarizing layer 43, a second TAC layer 44 and a surface protective layer 45 which are arranged in sequence. When the polarizer is attached to the display substrate, the stripping film 40 is removed at first, and then the polarizer is attached to the display substrate through the pressure-sensitive adhesive layer 41.

For instance, in the embodiment, the first protective layer 11 formed by a tape casting method is taken as one layer of the first polarizer 31. Meanwhile, as the first protective layer 11 is directly formed on the first surface 101 obtained after thinning, the first protective layer 11 and the first surface 101 can be firmly bonded together so as to save the pressure-sensitive adhesive layer 41, reduce the thickness of the display panel, and reduce the cost of the polarizer.

For instance, the first polarizer 31 may be a transmissive type polarizer, a reflective type polarizer, a transflective type polarizer or a compensation type polarizer. The first protective layer 11 and the second protective layer 13 can isolate moisture, oxygen and the like in the air to protect the first polarizing layer 12 from being affected by external moisture and prolong the service life of the first polarizing layer 12.

For instance, the material of the first polarizing layer 12 may be highly orientated high-molecular polymers and other suitable materials. The first polarizing layer 12 may be formed by allowing a polyvinyl alcohol (PVA) film to adsorb pigment with the property of dichroism. The pigment with the property of dichroism, for instance, may include iodine and organic dye (e.g., styrene, cyanine, azo or the like). The material of the second protective layer 13 may include a suitable material such as high molecular polymer. The high molecular polymer has the characteristics of high strength, optical isotropy, high light transmission rate, and moisture and heat resistance, and may be TAC for example. It should be noted that the material of the first protective layer 11, the first polarizing layer 12 and the second protective layer 13 may also be other suitable existing materials or materials developed in the future. No limitation will be given in the embodiment of the present disclosure to the material of the first polarizing layer 12 and the second protective layer 13.

For instance, the first protective layer 11, the first polarizing layer 12 and the second protective layer 13 may be subjected to different processes/treatment according to actual demands, so as to obtain the first polarizer 31 of different types. For instance, a birefringent optical compensation film can be stacked on the first polarizing layer 12, so the first polarizer 31 is a super twisted nematic (STN) polarizer. A light deflecting film may be stacked on the first polarizing layer 12, so the first polarizer 31 is a polarizer with wide or narrow viewing angle. Moreover, for instance, the first protective layer 11 and the second protective layer 13 may be subjected to a UV isolation treatment or an anti-glare treatment, so the first polarizer 31 is an anti-UV polarizer or an anti-glare polarizer correspondingly. The first protective layer 11 and the second protective layer 13 may further be subjected to anti-reflective treatment. For instance, one layer of anti-reflective film may be coated on the first protective layer 11 and/or the second protective layer 13. Thus, the reflectivity can be reduced according to the light interference principle; the light reflection loss can be reduced; the transmission rate can be improved; and the contrast difference can be improved. Moreover, for instance, the first protective layer 11, the first polarizing layer 12 and/or the second protective layer 13 may be pigmented, so that the first polarizer 31 can be various color polarizers.

For instance, a third protective layer may further be formed on the surface of the second protective layer 13. The third protective layer, for instance, may be an ethylene-vinyl acetate (EVA) copolymer or polyethylene (PE) film, and can protect the surface of the second protective layer 13 from being scratched.

For instance, the method for manufacturing the display panel may further comprise: forming display elements on the second surface 102 and the fourth surface 202 before thinning process.

For instance, the first display substrate 1 may be an array substrate or a CF substrate, and correspondingly, the second display substrate 2 may be a CF substrate or an array substrate. When the first display substrate 1 is a CF substrate and the second display substrate 2 is an array substrate, the display elements on the second surface 102 may include a black matrix, color filters and the like, and the display elements on the fourth surface 202 may include pixel electrodes, data lines, gate lines, thin film transistors (TFTs), etc.

For instance, the pixel electrodes and the TFTs can be formed by photolithography processes such as etching and development; the color filters and the black matrix also can be formed by processes such as etching and development;

and the color filters, for instance, may include red color filters, green color filters, blue color filters, etc. No limitation will be given here in the embodiment.

First Example

Figure 4E:
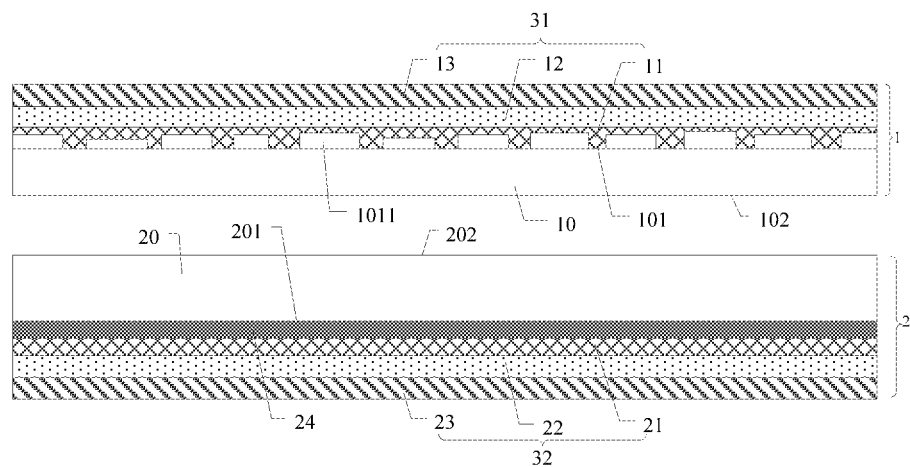

For instance, as illustrated in FIG. 4E, the method for manufacturing the display panel, provided by the first example, further comprises: bonding a second polarizer 32 to a third surface 201 of the second display substrate 2. The second polarizer 32 includes a third protective layer 21, a second polarizing layer 22 and a fourth protective layer 23 which are arranged in sequence. The second polarizer 32 may be bonded to the third surface 201 through a bonding layer 24.

For instance, the second polarizer 32 can be formed by a stretching method or a coating method. The stretching method may include a dry stretching or wet stretching method.

For instance, the bonding layer 24 may be made from pressure-sensitive adhesive or other suitable material. For instance, the pressure-sensitive adhesive may be high temperature and moisture resistant pressure-sensitive adhesive, so as to form a second polarizer 32 for a wide temperature range. Components for preventing the passage of ultraviolet light are added into the pressure-sensitive adhesive, so as to form an anti-UV second polarizer 32. The pressure-sensitive adhesive may be pigmented, so as to form a color second polarizer 32.

It should be noted that a stripping film may further be provided on the bonding layer 24. During transport, the stripping film can protect the bonding layer 24, so that the bonding layer can maintain its adhesivity. Thus, the second polarizer 32 can be firmly bonded to the third surface 201 after bonded to the second polarizer 32.

For instance, the second polarizer 32 may be of the same type as or different type from the first polarizer 31, as long as the polarization directions of the first polarizer 31 and the second polarizer 32 can be perpendicular to each other. No limitation will be given here in the embodiment.

Figure 4F:
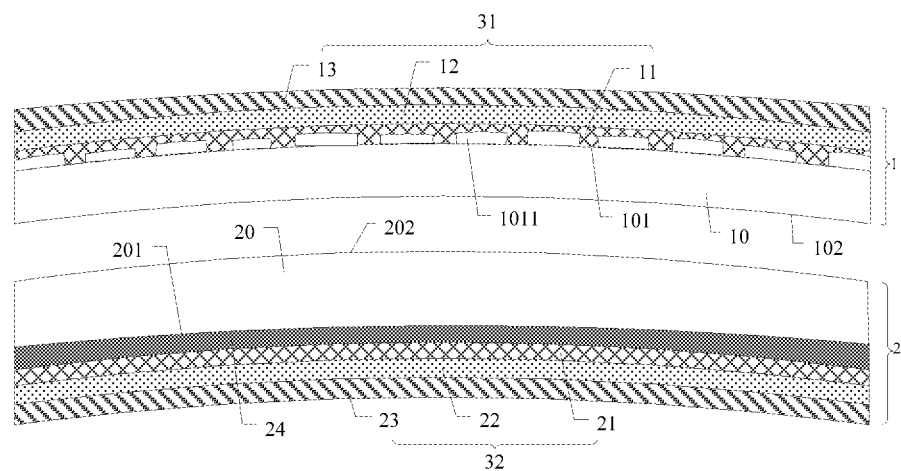

For instance, as illustrated in FIG. 4F, the method for manufacturing the display panel, provided by the example, further comprises: performing bending and solidification on the first display substrate 1 and the second display substrate 2 after the step of bonding the second polarizer 32, so as to form the curved display panel.

The method for manufacturing the display panel, provided by the first example, only needs to perform the thinning process on the first display substrate 1, directly bonds a polarizer finished product to the second display substrate 2, and hence reduces the manufacturing processes and improves the production efficiency.

Second Example

Figure 4G:
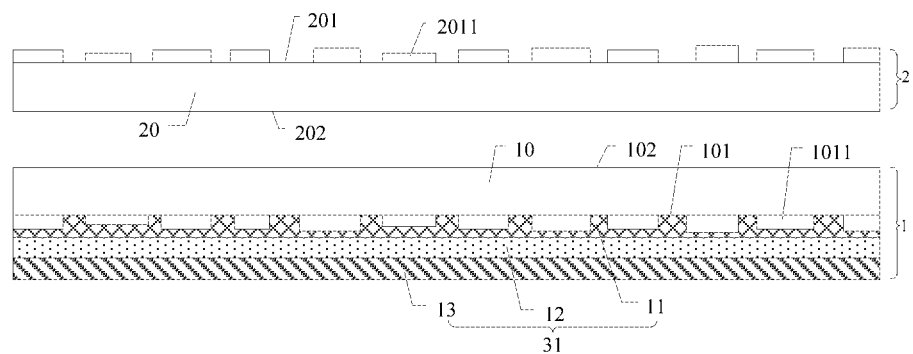

For instance, as illustrated in FIG. 4G, the method for manufacturing the display panel, provided by the second example, further comprises: reducing the thickness of the second base substrate 20 from the third surface 201 by way of a thinning process.

For instance, the first surface 101 and the third surface 201 may be simultaneously subjected to thinning processes, so as to further simplify the manufacturing processes and reduce the production time.

For instance, as illustrated in FIG. 4G, the surface topography of the third surface 201 obtained after thinning is also changed; and a second concave-convex structure 2011 is formed on the third surface 201. The second concave-convex structure 2011 increases the height difference in the topography of the third surface 201 so as to increase the roughness of the third surface 201. The concave-convex degree of the second concave-convex structure 2011 is in direct correlation with the reduced thickness of the second base substrate 20. That is to say, when the reduced thickness of the second base substrate 20 is larger, the concave-convex degree of the second concave-convex structure 2011 becomes higher.

Figure 4H:
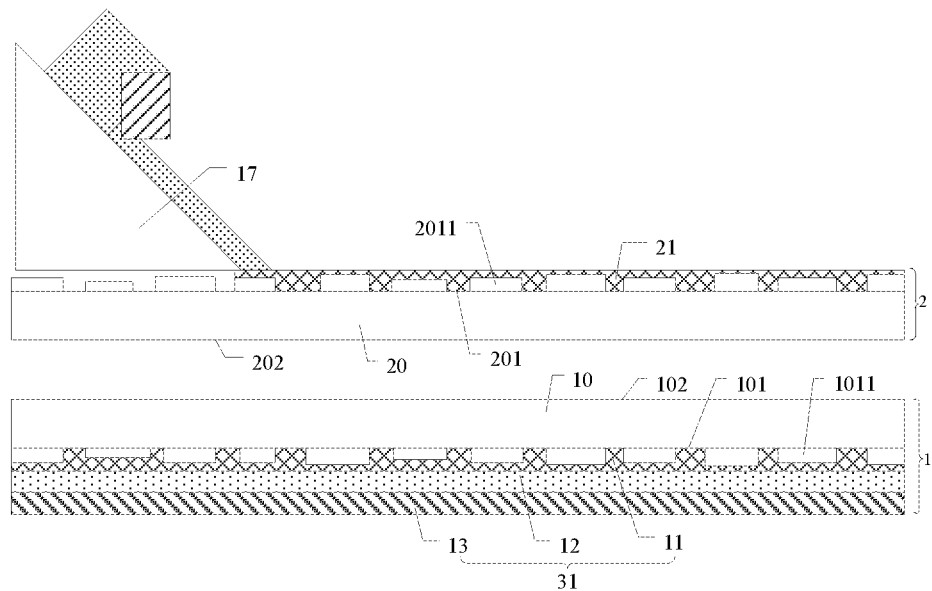

For instance, as illustrated in FIG. 4H, a third protective layer 21 is formed on the third surface 201 obtained after thinning by a tape casting method.

For instance, the difference between the refractive index of the third protective layer 21 and the refractive index of the second base substrate 20 is not greater than 10% of the refractive index of the second base substrate 20. Thus, the third protective layer 21 not only can reduce the height difference of the third surface 201 but also will not affect or less affect the optical path difference when light runs through the second base substrate 20 and the third protective layer 21. According to the material of the second base substrate 20, the third protective layer 21 may also be made from different materials. The second base substrate 20, for instance, may be the same as the first base substrate 10, so the material of the third protective layer 21 may also be the same as the material of the first protective layer 11.

Figure 4I:
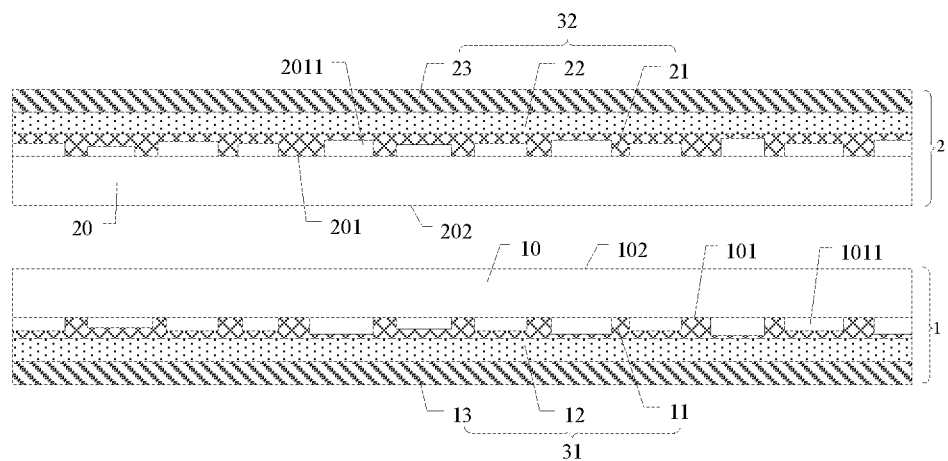

For instance, as illustrated in FIG. 4I, the method for manufacturing the display panel, provided by the example, further comprises: pressing a second polarizing layer 22 and a fourth protective layer 23 on the third protective layer 21 in sequence, so as to form a second polarizer 32 by the third protective layer 21, the second polarizing layer 22 and the fourth protective layer 23.

For instance, the material of the second polarizing layer 22 may be the same as that of the first polarizing layer 12, and the material of the fourth protective layer 23 may also be the same as that of the second protective layer 13. No further description will be given here.

For instance, in the example, the third protective layer 21 of the second polarizer 32 is directly formed on the third surface 201, so as to save the bonding layer, further reduce the thickness of the display panel, and reduce the production cost.

Figure 4J:
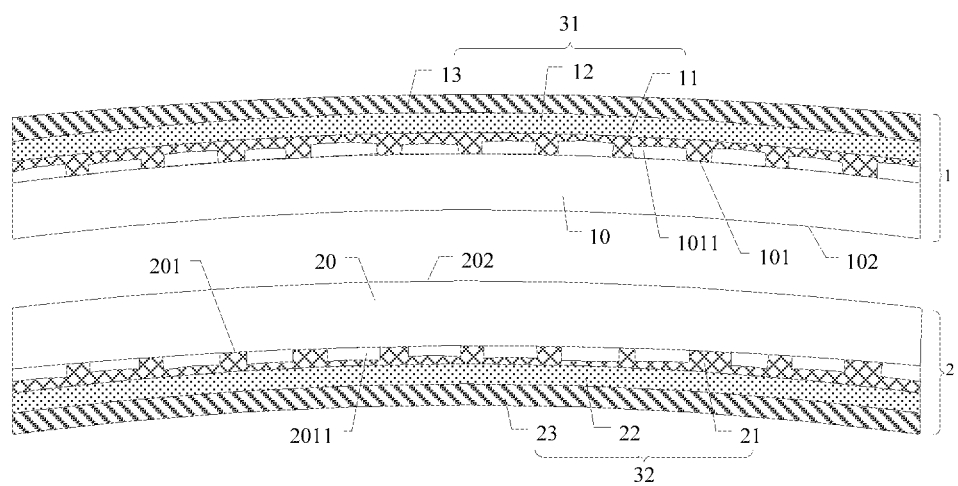

For instance, as illustrated in FIG. 4J, the method for manufacturing the display panel, provided by the example, further comprises: performing bending and solidification on the first display substrate 1 and the second display substrate 2 after the step of forming the second polarizer 32, so as to form the curved display panel.

The method for manufacturing the display panel, provided by the second example, performs thinning processes on both the first display substrate 1 and the second display substrate 2, and hence reduces the thickness of each display substrate, effectively reduces the height difference of the surface obtained after thinning, avoids the breakage possibility of the display substrate, and improves the product yield. On the other hand, both the first polarizer and the second polarizer are not required to be bonded to the display substrate through bonding layers, so that the production cost can be further reduced.

It should be noted that the materials of the protective layer and the polarizing layer and the manufacturing processes and the parameters of the thinning process and the tape casting method in the method for manufacturing the display panel, provided by the second embodiment, are all applicable to the method for manufacturing the display substrate, provided by the first embodiment.

Third Embodiment

Figure 7A:
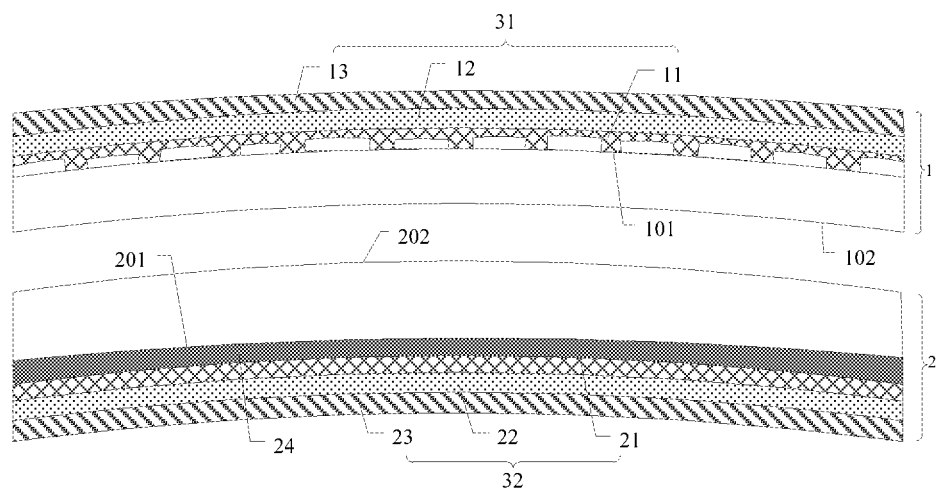
FIG. 7A is a schematic structural sectional view of a display panel provided by an embodiment of the present disclosure.
Figure 7B:
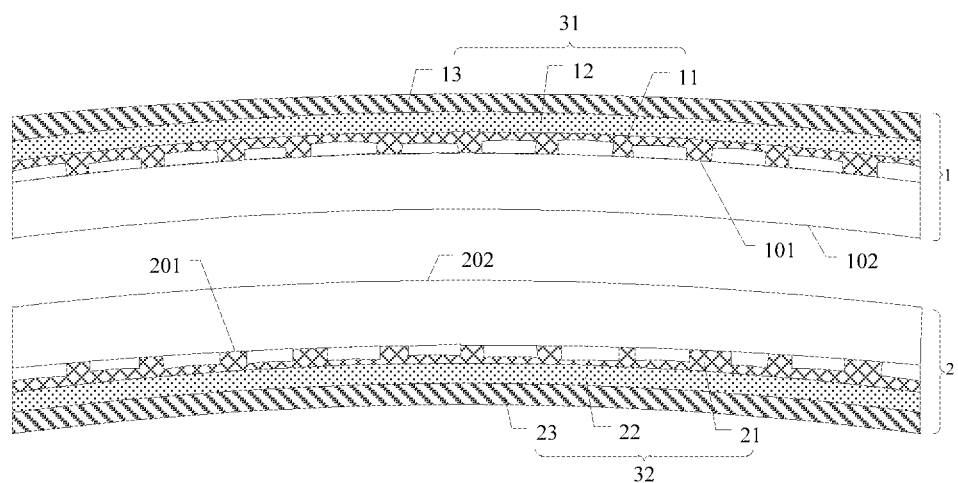
FIG. 7B is a schematic structural sectional view of another display panel provided by an embodiment of the present disclosure.

The embodiment provides a display panel. FIG. 7A is a schematic structural sectional view of the display panel provided by the embodiment. FIG. 7B is a schematic structural sectional view of another display panel provided by the embodiment.

For instance, as illustrated in FIG. 7A, the display panel comprises a first display substrate 1 and a second display substrate 2. The first display substrate 1 and the second display substrate 2 are arranged opposite to each other; the first display substrate 1 includes a first surface 101 away from the second display substrate 2 and a second surface 102 facing the second display substrate 2; a first polarizer 31 is disposed on the first surface 101 and includes a first protective layer 11, a first polarizing layer 12 and a third protective layer 13 which are arranged in sequence; and the first protective layer 11 is in direct contact with the first surface 101.

The first protective layer of the display panel can improve the topography of the first surface, reduce the height difference in the topography of the first surface, improve the product yield, and improve the display effect and the contrast of display. On the other hand, the first polarizer of the display panel is directly disposed on the first base substrate through the first protective layer, and no bonding layer is required. Thus, the cost of the polarizer can be saved; the thickness of the display panel can be reduced; and ultrathin design can be achieved.

For instance, as illustrated in FIG. 7A, the display panel is a curved display panel. The first protective layer 11 can effectively improve the height difference in the topography of the first surface 101 obtained after thinning, reduce the light phase difference between a border area and a central area of the curved display panel, and hence alleviate the poor dark-state light leakage phenomenon, improve the product yield, and improve the display quality and the contrast of display.

For instance, the material of the first protective layer 11, the first polarizing layer 12 and the second protective layer 13 may be the same as those of the second embodiment. No further description will be given here.

For instance, the first polarizer 31 may further include a compensating film. As for an STN polarizer, the compensating film can realize phase difference compensation at a certain angle so as to convert greenish yellow into black and white display. As for a polarizer for TFTs, the compensating film can increase the viewing angle or improve the brightness.

For instance, as illustrated in FIGS. 7A and 7B, the second display substrate 2 may include a third surface 201 away from the first display substrate 1 and a fourth surface 202 facing the first display substrate 1.

For instance, as illustrated in FIG. 7A, in one example, a second polarizer 32 is disposed on the third surface 201, and the second polarizer may include a third protective layer 21, a second polarizing layer 22 and a fourth protective layer 23, and may be bonded to the third surface 201 through a bonding layer 24.

For instance, the material of the bonding layer 24 may be the same as the material as described in the second embodiment. No further description will be given here.

For instance, as illustrated in FIG. 7B, in another example, a second polarizer 32 is disposed on the third surface 201 and may include a third protective layer 21, a second polarizing layer 22 and a fourth protective layer 23; and the third protective layer 21 may make direct contact with the third surface 201. In the example, the second polarizer 32 does not need to be bonded to the second display substrate 2 through a bonding layer, so as to further reduce the production cost.

For instance, the materials of layers of the second polarizer 32 may be the same or different from the materials of corresponding layers of the first polarizer 31. No limitation will be given here.

For instance, the display panel may be a liquid crystal display (LCD) panel, so the display panel further comprises a liquid crystal layer (not shown in FIGS. 7A and 7B) disposed between the first display substrate 1 and the second display substrate 2. It should be noted that the display panel may be set to be in a normal black display mode under the condition of no external voltage, namely the polarization axis of the first polarizer 31 is perpendicular to the polarization axis of the second polarizer 32. Under the condition of no external voltage, back light generates linear polarized light parallel to the long axes of liquid crystal molecules after passing the first polarizer 31, do not rotate in the polarization direction without the state being changed, and then is incident into the second polarizer 32. As the polarization axes of the first polarizer 31 and the second polarizer 32 are perpendicular to each other, the linear polarized light is also perpendicular to the polarization axis of the second polarizer 32. Thus, the linear polarized light can be completely shielded by the second polarizer 32, namely the back light cannot run through the display panel and the display panel presents a black display mode.

For instance, display elements may be provided on the second surface 102 and the fourth surface 202. According to the type of the first display substrate 1 and the second display substrate 2, the display elements may be pixel electrodes, data lines, gate lines, TFTs, common electrodes, black matrix, color filters, etc.

For instance, the first display substrate 1 or the second display substrate 2 may also be bonded with a flexible circuit board, so as to be connected with a drive circuit through the flexible circuit board. The drive circuit can drive the display elements on the display panel to display.

For instance, the first display substrate 1 may be an array substrate or a CF substrate, and correspondingly, the second display substrate 2 may be a CF substrate or an array substrate.

For instance, the display panel may further comprise a plurality of spacers (not shown in FIGS. 7A and 7B) disposed between the first display substrate 1 and the second display substrate 2. The spacers can maintain the uniformity of the cell gap of the display panel and prevent the dark-state light leakage phenomenon due to different thicknesses of the display panel at different positions.

For instance, the display panel provided by the embodiment may be applicable to the IPS display mode, for instance, may be applicable to ADS mode, fringe field switching (FFS) mode, etc.

Fourth Embodiment

The embodiment provides a display device, which comprises any display panel provided by the third embodiment. Thus, the display device can effectively improve the dark-state light leakage phenomenon, improve the product yield, and improve the display effect.

For instance, the display device may be a display device such as an LCD device and any product with display function including the display elements, e.g., a TV, a digital camera, a mobile phone, a watch, a tablet PC, a notebook computer or a navigator. The embodiment is not limited thereto.

For instance, one example of the display device is an LCD device, in which the first display substrate, for instance, may be an array substrate; the second display substrate may be a CF substrate; the first display substrate and the second display substrate are arranged opposite to each other to form a liquid crystal cell; and liquid crystal materials are filled in the liquid crystal cell. A pixel electrode of each pixel unit of the first display substrate is configured to apply an electric field to control the rotation degree of the liquid crystal molecules, so as to achieve display. In some examples, the LCD device further comprises a backlight for providing back light for the array substrate.

The following statements should be noted:

The accompanying drawings involve only the structure(s) in connection with the embodiment(s) of the present disclosure, and other structure(s) can be referred to common design(s).

For the purpose of clarity only, in accompanying drawings for illustrating the embodiment(s) of the present disclosure, the thickness and size of a layer or a structure may be enlarged. However, it should understood that, in the case in which a component or element such as a layer, film, area, substrate or the like is referred to be "on" or "under" another component or element, it may be directly on or under the another component or element or a component or element is interposed therebetween.

In case of no conflict, features in one embodiment or in different embodiments can be combined.

What are described above is related to the illustrative embodiments of the disclosure only and not limitative to the scope of the disclosure; the scopes of the disclosure are defined by the accompanying claims.

What is claimed is:

1. A method for manufacturing a display panel, comprising:
    providing a first display substrate and a second display substrate, in which the first display substrate includes a first surface and a second surface which are opposite to each other;
    cell-assembling the first display substrate and the second display substrate, so that the second surface of the first display substrate faces the second display substrate;
    reducing a thickness of the first display substrate from the first surface by way of a thinning process;
    forming, by a tape casting method, a first protective layer on the first surface obtained after thinning;
    pressing a first polarizing layer and a second protective layer on the first protective layer in sequence, so as to form a first polarizer by the first protective layer, the first polarizing layer, and the second protective layer;
    bonding a second polarizer to a third surface of the second display substrate away from the first display substrate, wherein the second polarizer includes a third protective layer, a second polarizing layer, and a fourth protective layer which are arranged in sequence, and wherein the second polarizer is bonded to the third surface through a bonding layer; and
    forming a curved display panel by bending and solidification of the first display substrate and the second display substrate after bonding the second polarizer to the second display substrate.

2. The method for manufacturing the display panel according to claim 1, further comprising:
    reducing a thickness of the second display substrate from the third surface of the second display substrate away from the first display substrate by way of a thinning process; and
    forming, by a tape casting method, a third protective layer on the third surface obtained after thinning.

3. The method for manufacturing the display panel according to claim 2, further comprising:
    pressing the second polarizing layer and the fourth protective layer on the third protective layer in sequence, so as to form the second polarizer by the third protective layer, the second polarizing layer, and the fourth protective layer.

4. The method for manufacturing the display panel according to claim 1, wherein display elements are provided on the second surface of the first display substrate.

5. The method for manufacturing the display panel according to claim 1, wherein a difference between a refractive index of the first display substrate and a refractive index of the first protective layer is not greater than 10% of the refractive index of the first display substrate.

* * * * *